Feb. 13, 1962 C. C. ROE 3,020,739
TORQUE TRANSMITTING DEVICE
Filed May 11, 1960 2 Sheets-Sheet 1

INVENTOR:
CHARLES C. ROE
BY John F. Schmidt

INVENTOR:
CHARLES C. ROE
BY John F. Schmidt

United States Patent Office 3,020,739
Patented Feb. 13, 1962

3,020,739
TORQUE TRANSMITTING DEVICE
Charles C. Roe, East Peoria, Ill., assignor to LeTourneau-Westinghouse Company, Peoria, Ill., a corporation of Illinois
Filed May 11, 1960, Ser. No. 28,460
14 Claims. (Cl. 64—27)

This invention relates to a torque transmitting device, and especially to such a device which is capable of absorbing torsional vibration.

There are numerous situations in industry today in which torque must be transmitted from a prime mover to a machine which is capable of converting the torque into useful work. Devices which transmit the torque are often subject to serious torsional vibration which may have at least two sources, one such source being the power impulses of such a prime mover as an internal combustion engine; another source may be the machine which is being driven and which offers resistance to rotation which varies either during each revolution or as the load varies or both. A direct mechanical connection of the prime mover and the driven machine often results in fatigue stresses, and these fatigue stresses ultimately result in failure in shafts or other elements of the connected equipment.

It is accordingly an object of this invention to provide a torque transmitting device which is capable of absorbing torsional vibration. Such devices are not broadly new, but the devices of the prior art have certain shortcomings and limitations, among which is a high incidence of failure in service of such devices. It is accordingly another object of this invention to provide a torque transmitting device which is capable of absorbing torsional vibration but which is itself not subject to intolerable fatigue stresses and which therefore is capable of a longer service life than is possible today in similar devices of comparable cost.

Figure 1:
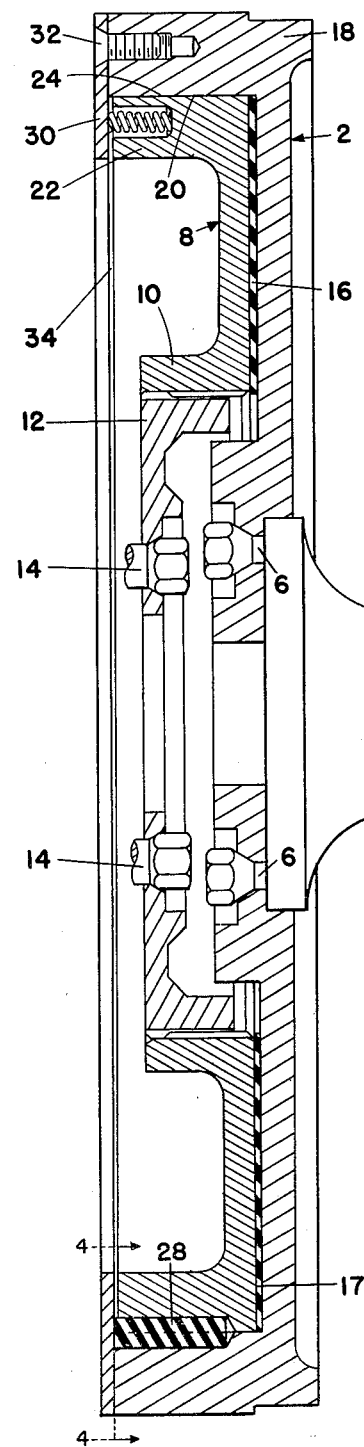
FIG. 1 is a longitudinal sectional view through a device embodying this invention, being a view in section on line 1—1 of FIG. 5.

Basically, the torque transmitting device in the embodiment shown here comprises two rotatable masses (rotatable about substantially coincident axes) having two sets of cooperating surfaces. One set of surfaces is adapted to be frictionally engaged, and the other set of surfaces forms cavities adapted to receive a resilient elastic substance. The second surfaces in the embodiment shown are cylindrical surfaces and each cavity referred to is made up of a recess in one cylindrical surface cooperating with a matching recess in the other cylindrical surface. Means resiliently biasing the two friction surfaces together are provided.

Referring now to the drawings in detail, a mass 2 is shown as being connected to a source of power which may be the crankshaft 4 of an internal combustion engine. Any suitable means such as capscrews 6 may be used to secure the power source 4 to the mass 2.

A second rotatable mass 8 is shown closely adjacent to the mass 2. Mass 8 is provided with a central hub portion 10 which is internally splined as shown to receive a cooperating externally splined output connection 12. The output connection 12 can be connected with any suitable flexible connector (such, for example, as a universal joint) by any suitable means such as the capscrews shown at 14. The flexible connection, which is not shown here, will of course be connected with the driven machine. It will of course be understood by those skilled in the art that the flexible connection will permit a misalignment of the axes of power source 4 and the driven machine without significantly affecting the coincidence of the axes of rotation of masses 2 and 8.

Reference was made above to a set of surfaces on the two masses adapted to be frictionally engaged. Toward this end, mass 2 is provided with a surface 15 which is here referred to as a "friction surface"; in the embodiment shown, this friction surface is annular. Mass 8 is also provided with a friction surface 17, and the friction surface 17 of mass 8 is in close proximity to friction surface 15 of mass 2 and is likewise annular. A suitable friction material or clutch facing may be applied to one or both of the friction surfaces of the masses 2 and 8. The manner of accomplishing this is well enough understood by men skilled in the art and need not be detailed here except to point out that the friction material is here shown at 16. It will further suffice to point out that the torque transmitting device is preferably designed so that from 50 percent to 75 percent of the total torque is transmitted by the friction surfaces. The means for biasing the friction surfaces into torque-transmitting engagement will be discussed below.

Figure 4:
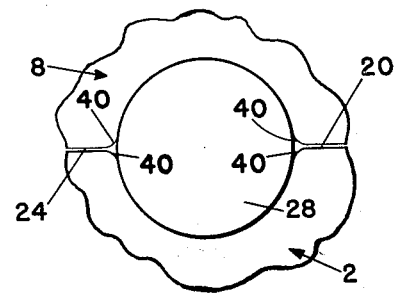
FIG. 4 is a view along the plane of line 4—4 of FIG. 1, and on a still larger scale than that of FIGS. 2 and 3.
Figure 5:
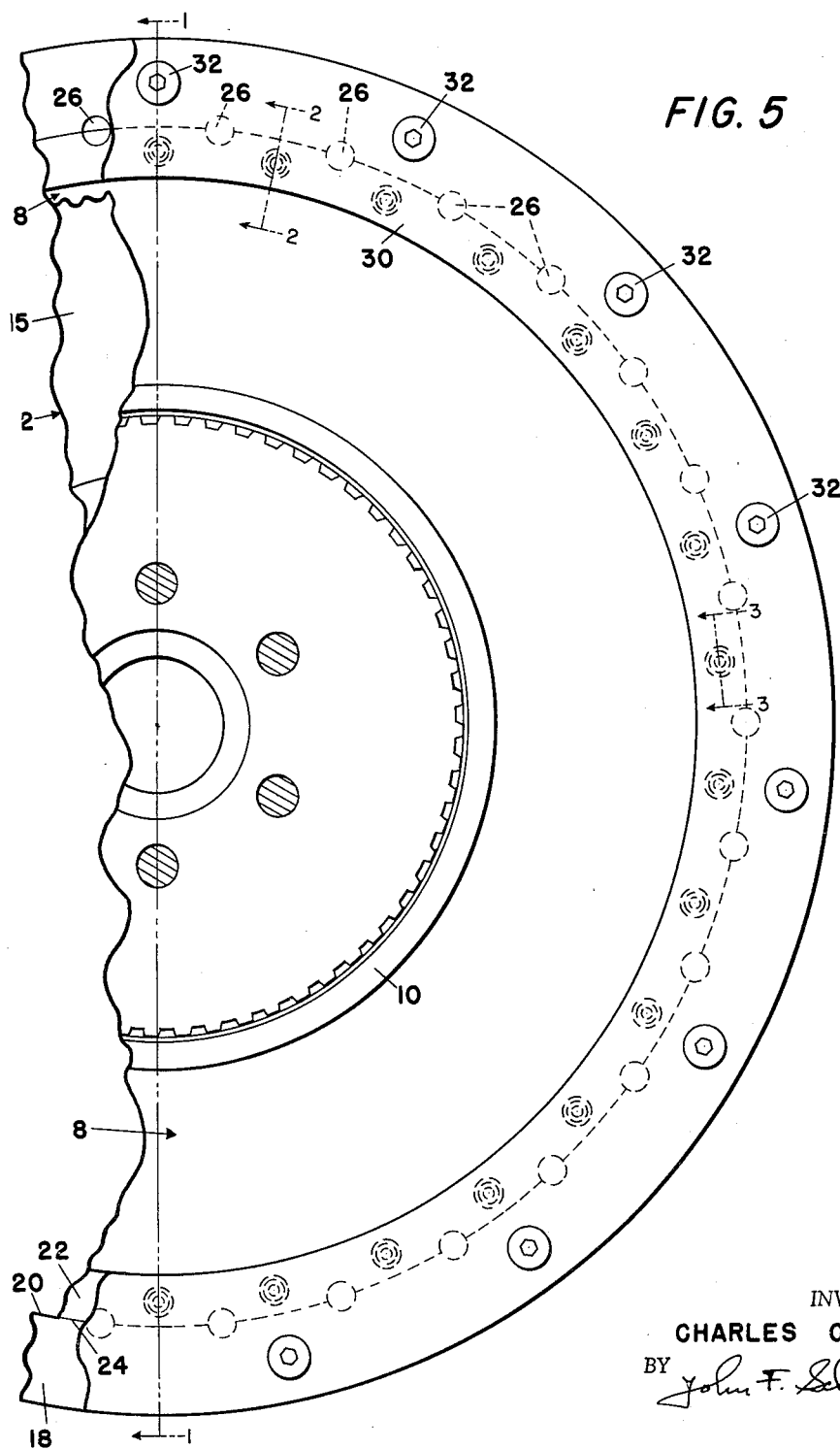
FIG. 5 is an end elevation view of the device shown in FIG. 1, being a view from the left of FIG. 1.

The second set of surfaces referred to above is provided in the embodiment shown by the fact that the rotatable masses 2 and 8 are cylindrical. Thus, the mass 2 has an axially extending cylindrical portion 18 which provides an internal cylindrical surface 20 which is the second surface of the mass 2 referred to in the claims. In like manner, the mass 8 has an axially extending cylindrical portion 22 which is provided with an external cylindrical surface 24, surface 24 being the second surface of the mass 8 referred to in the claims. As is clearly seen in the drawings, the surfaces 20 and 24 are disposed in close proximity. Each of these second surfaces is provided with a plurality of recesses; more accurately, each of the masses is provided in its second surface with a plurality of recesses. The recesses in one mass are equal in number to the recesses in the other mass and they are located so that a recess in one of the masses is aligned and cooperates with a recess in the other mass to form a complete cavity shown at 26 in FIG. 5. These cavities are preferably substantially cylindrical and are also preferably uniformly spaced about the periphery of the "split line," this being the circle at which the two cylindrical surfaces appear to come together as seen in FIG. 4 and FIG. 5. As is best seen in FIG. 4, the device is made with a slight gap between the cylindrical surfaces 20 and 24 in order to assure that there is no rubbing contact of these surfaces.

The cavities 26 are filled with a resilient elastic substance 28. This substance is in the form of cylinders and is rubber. The rubber cylinders (or plugs as they are sometimes called) are desirably from 1/32 to 1/16 inch longer than the cavities they occupy and are compressed in order to fill these cavities completely. If the torque transmitting device is properly designed, the rubber plugs will be stressed to only 10 percent of their shear strength, at a maximum.

While it may be conceded that rubber plugs of any composition will serve the purpose of the invention to some extent, it should be pointed out that for a satisfactory service life, the plugs should be made of a good tire tread rubber. The rubber should be tough, it should be resilient in compression, it should be elastic when flexed, should have a good shear strength, it should be a rubber which cannot be extruded, it should have low hysteresis qualities, and it should not harden at low temperatures or melt at high temperatures; a good practical range for the latter requirement is −40° F. to 300° F.

Those skilled in the art will realize that there are many rubber compounds which could be used satisfactorily in a torque transmitting device made according to this invention. Because the formula for such a rubber can vary widely within satisfactory limits, it is neither necessary nor desirable to attempt to set forth a formula here. It will suffice to indicate the physical qualities that are considered desirable, in view of the fact that many satisfactory rubbers are commercially available. For example, the Firestone Tire and Rubber Company has advertised a number of rubber compounds in a publication identified as "2 Rev. 4–59" and bearing the heading "Mutac Non-Blooming Tread Rubber (Camelback)." Of the rubber compounds there listed, the compounds reproduced herebelow would give satisfactory performance:

(1) Supreme heavy duty (natural rubber) tread rubber (camelback).
(2) Supreme heavy duty "K" type-natural rubber-tread rubber (camelback).
(3) Supreme 4145 tread rubber (camelback).
(4) Supreme tread rubber (camelback).
(6) Town & country tread rubber (camelback).
(8) Polar grip tread rubber (camelback).
(9) Polar grip duplex tread rubber (camelback).
(12) Tractor treads and tractor side strips.
(13) Supreme cut-resistant tread rubber (100% cold rubber).
(14) Special service 949 treads and side strips (natural rubber).
(15) Special service treads and side strips (natural rubber).

From the known qualities or characteristics of the above listed compounds, those skilled in the art can readily determine what type of rubber of any other commercial supplier can be used to produce a satisfactory service life.

Figure 2:
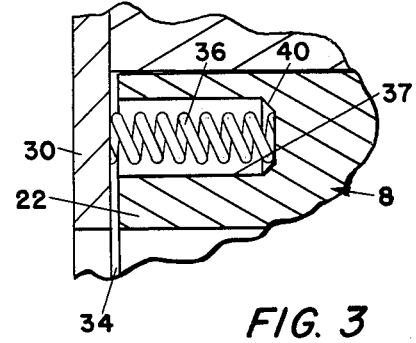
FIG. 2 is a view in section on line 2—2 of FIG. 5 but on a much larger scale.
Figure 3:
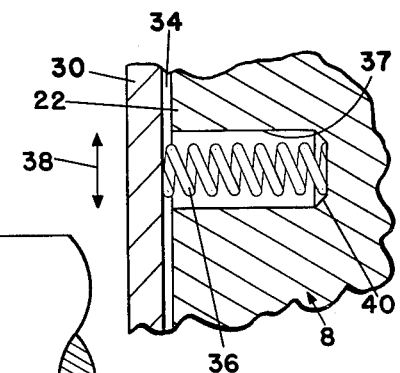
FIG. 3 is a view similar to FIG. 2 and on the same scale as FIG. 2, but turned through 90°, being a view in section on line 3—3 of FIG. 5.

Reference was made above to means biasing the two friction surfaces together, and these means will now be described in detail. To carry out this function, both masses are provided with reaction means, and a plurality of elongated resilient pressure-transmitting members engage the reaction means. In the embodiment shown, mass 2 is provided with a reaction member 30 which is here shown as an annular ring secured to one face of cylindrical portion 18 in any suitable way, as, for example, by threaded fasteners 32. Reaction member 30 overlaps the "split line" formed by the second (or cylindrical) surfaces 20 and 24 of the two masses. This overlap is probably best shown in FIGS. 1 and 5. Although reaction member 30 is of course tightly secured to the face of cylindrical portion 18 of mass 2, there is necessarily a small amount of clearance 34 between the corresponding face of cylindrical portion 22 of mass 8 and the inner face of the reaction member 30 as seen in FIGS. 1–3. The gap or clearance is necessary in order to permit oscillation of mass 2 relative to mass 8 about their coincident axes of rotation.

As here shown, the elongated resilient pressure-transmitting members are coil springs 36 disposed in recesses 37 in mass 8, one spring to each recess. In this embodiment, springs 36 are designed to be in compression between the inner face of reaction member 30 and the right ends of the recesses 37; see especially FIGS. 2 and 3. In a preferred form, springs 36 are cylindrical helices. In order to achieve better control over the torsional vibrations encountered in a drive of this sort, it is desirable that the reaction means be designed in such a way as to prevent sliding of the springs 36 relative to the reaction means. Relative oscillation of the two masses would effect movement of reaction member 30 relative to mass 8 and this movement would be in the plane of the paper of FIG. 3 as shown by the arrow 38. It is apparent from FIG. 3, that provision must be made for some movement of the left end of spring 36 in its recess 37 if sliding of the left end of the spring on reaction member 30 is to be avoided. To assure that there will be no such sliding movement, spring 36 should be smaller than recess 37 in the circumferential direction, namely as shown in FIG. 3. As is clearly seen in both FIGS. 2 and 3, recesses 37 (which are drilled holes) are provided at their right ends with a short frusto-conical portion 40. Springs 36 are preferably of such a size that each spring seats in the smaller diameter of the frusto-conical portion. With the spring and the recess made in this manner, there is clearance between the outside diameter of the spring and the walls of recess 37 in the circumferential direction, this being the plane of the paper as seen in FIG. 3.

Reference was made above to the fact that the rubber plugs 28 are slightly longer than the cavities 26 and are compressed in order completely to fill the cavities. While plugs 28 should be of a diameter to fit without looseness in the cavities, complete filling of the cavities is accomplished by endwise compression of the plugs by virtue of engagement of the left ends of the plugs with the face of reaction member 30.

It should also be pointed out at this time that the recesses forming the cavities 26 should have rounded edges as shown at 40, FIG. 4, in order further to assure against shear of the plugs along the split line.

Operation

By hypothesis, either the input or the output, or both, of the torque transmitting device may be subjected to variations in the angular velocity. The masses 2 and 8 would be free to oscillate relative to each other about their substantially coincident axes of rotation, if it were not for the resilient elastic substance in the form of plugs 28, and engagement of the two friction surfaces by means of the friction material 16. Variations in angular velocity are absorbed by compression of the rubber plugs 28 and also of course by the "drag" imposed upon such relative rotation or oscillation by the contact of the two friction surfaces, here shown as taking place through the friction facing 16. However, it will be understood by those skilled in the art that the principal purpose of the friction surface engagement is to dampen the oscillations which would otherwise be set up by the resilient elastic rubber plugs.

From 50 percent to 75 percent of the torque transmitted is taken through the contact of the two adjacent friction surfaces, and engagement of these surfaces is assured by the pressure of springs 36 bearing against reaction member 30 and the ends of their respective recesses 37. As the variations in angular velocity take place due to power impulses at the input side or for other reasons, the two masses 2 and 8 attempt to move relatively to each other, and of course some such movement does take place within the limits of the rubber plugs and the friction material 16. Such movement will cause the springs 36 to move slightly in their recesses; more specifically, the axes of these helical springs will vibrate from their neutral position which is parallel to the axis of rotation of mass 2. Such movement will take place in the plane of FIG. 3. Because the spring diameters are smaller than the recesses in the circumferential direction, the springs 36 may vibrate slightly without sliding relative to reaction member 30.

It may also be noted that the round edges 40 of the recesses in the two cylindrical surfaces (FIG. 4), along with the fact that the size and number of the plugs is such that they are subject to a maximum shear stress which is no greater than 10 percent of their shear strength, combine to prevent shearing of the plugs and ultimate failure of the torgue transmitting device.

It will be apparent to those skilled in the art that there is here set forth an economical and effective torque transmitting means which is capable of transmitting torque without transmitting torsional vibration. Other advantages will be apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. A rotatable first mass having a friction surface and a second surface, a rotatable second mass having a friction surface in close proximity to the friction surface of said first mass and having a second surface in close proximity to said second surface of the first mass, the two masses having an equal number of a plurality of recesses in their respective second surfaces arranged in pairs and cooperating to form cavities, a resilient elastic substance in each such cavity, and means resiliently biasing the two friction surfaces together.

2. The combination of claim 1, in which the first mass and the second mass are rotatable about a common axis, said second surfaces being cylindrical and having axes coincident with said common axis whereby movement of the first mass and the second mass relative to each other causes elastic deformation of the resilient substance in the several cavities.

3. The combination of claim 1, in which the last-named means cause the friction surfaces to transmit at least half of the torque.

4. A rotatable first mass having a friction surface and a second surface; a rotatable second mass having a friction surface in close proximity to the friction surface of said first mass and having a second surface in close proximity to said second surface of the first mass; a resilient elastic substance; means to cause elastic deformation of said resilient substance upon the occurrence of rotation of the first mass relative to the second mass, said means including the aforesaid second surfaces of the first and second masses; and other means resiliently biasing the two friction surfaces together and including a plurality of cylindrical recesses of which the cylindrical axes are parallel to the axes of rotation of the rotatable masses, and a resilient device in each such recess in engagement with both rotatable masses and having a smaller radial dimension than the radius of its cylindrical recess whereby the resilient device vibrates in its recess as the first and second masses oscillate about their axes of rotation relative to each other without causing radial contact of the resilient device with the wall of its recess.

5. The combination of claim 4, in which the last-named means cause the friction surfaces to transmit from 50 percent to 75 percent of the torque.

6. A rotatable first mass having a friction surface and a second surface, a rotatable second mass having a friction surface in close proximity to the friction surface of said first mass and having a second surface in close proximity to said second surface of the first mass, a resilient elastic substance, means to cause elastic deformation of said resilient substance upon the occurrence of rotation of the first mass relative to the second mass, said means including the aforesaid second surfaces of the first and second masses, and other means in engagement with both rotatable masses and resiliently biasing the two friction surfaces together to transmit from 50 percent to 75 percent of the torque by means of the friction surfaces.

7. A rotatable first mass having a friction surface and a second surface, the second surface being a cylinder having its cylindrical axis coincident with the axis of rotation of the mass; a rotatable second mass having a friction surface in close proximity to the friction surface of the first mass and having a second surface, the second surface of the second mass being a cylinder in close proximity to the second surface of the first mass; a resilient elastic substance; means, including the portions of the two masses contiguous to the two cylindrical surfaces, to cause elastic deformation of said resilient substance upon the occurrence of rotation of the first mass relative to the second mass; and other means resiliently biasing the two friction surfaces together and including a plurality of resilient elastic members each of which engages both rotatable masses, and means to permit limited movement of said members while preventing sliding thereof relative to the rotating masses while the rotating masses oscillate relative to each other about their axes of rotation.

8. A rotatable first mass having a friction surface and a second surface, the second surface being a cylinder having its cylindrical axis coincident with the axis of rotation of the mass; a rotatable second mass having a friction surface in close proximity to the friction surface of the first mass and having a second surface, the second surface of the second mass being a cylinder in close proximity to the second surface of the first mass; a resilient elastic substance; means, including the portions of the two masses contiguous to the two cylindrical surfaces, to cause elastic deformation of said resilient substance upon the occurrence of rotation of the first mass relative to the second mass; and other means resiliently biasing the two friction surfaces together including a plurality of helical springs, a reaction member carried by one of the masses adjacent the cylindrical surface thereof and overlapping the cylindrical surface of the second mass, the reaction member engaging one end of each of the springs, and means associated with the other mass to receive the reaction of the other end of each of the springs without sliding of the springs on the reaction member as the two masses oscillate relative to each other about their axes of rotation.

9. The combination of claim 8, in which said reaction receiving means includes a plurality of recesses in the second mass to receive the plurality of springs, each recess being larger than its spring in the direction of oscillation.

10. A rotatable first mass having a friction surface and a second surface, a rotatable second mass having a friction surface in close proximity to the friction surface of said first mass and having a second surface in close proximity to said second surface of the first mass, a resilient elastic substance, means to cause elastic deformation of said resilient substance upon the occurrence of rotation of the first mass relative to the second mass, said means including the aforesaid second surfaces of the first and second masses, and other means resiliently biasing the two friction surfaces together including a plurality of elongated springs, a reaction member carried by one of the masses and overlapping the second surfaces of the two masses, the reaction member engaging one end of each of the springs, and means associated with the other mass to receive the reaction of the other end of each of the springs without sliding of the springs on the reaction member as the two masses oscillate relative to each other about their axes of rotation.

11. The combination of claim 10, in which said reaction receiving means includes a plurality of recesses in the second mass to receive the plurality of springs, each recess being larger than its spring in the direction of oscillation.

12. A rotatable first mass having a friction surface and a second surface; a rotatable second mass having a friction surface in close proximity to the friction surface of said first mass and having a second surface in close proximity to said second surface of the first mass; a resilient elastic substance; means to cause elastic deformation of said resilient substance upon the occurrence of rotation of the first mass relative to the second mass, said means including the aforesaid second surfaces of the first and second masses; and other means resiliently biasing the two friction surfaces together including a plurality of elongated resilient pressure-transmitting members, a reaction member associated with one of the masses and serving to engage one end of each of the elongated members, and reaction means associated with the other mass to engage the other end of each of the elongated members without sliding of the elongated members on the reaction member as the two masses oscillate about their axes of rotation relative to each other.

13. A torque transmitting device comprising a rotatable first mass having a cylindrical surface of which the cylindrical axis coincides with the axis of rotation of the mass; a rotatable second mass having a cylindrical surface in close proximity to the first-named cylindrical surface; said masses having cavities circumferentially spaced in the two cylindrical surfaces, each such cavity lying partly in the first mass and partly in the second; a resilient substance disposed in the cavities and deformable upon relative oscillation of the two masses about their axes of rotation; a source of power connected to drive the first mass; and an output connection driven by the second mass.

14. A rotatable first mass having a cylindrical surface of which the cylindrical axis coincides with the axis of rotation of the mass; a rotatable second mass having a cylindrical surface in close proximity to the first-named cylindrical surface; said masses having cavities circumferentially spaced in the two cylindrical surfaces, each such cavity lying partly in the first mass and partly in the second; a resilient substance disposed in the cavities and deformable upon relative oscillation of the two masses about their axes of rotation; and means to dampen said oscillation.

References Cited in the file of this patent

UNITED STATES PATENTS

| | | |
|---|---|---|
| 1,939,855 | Kreis | Dec. 19, 1933 |
| 1,984,578 | Griswold | Dec. 18, 1934 |
| 2,153,914 | Christman | Apr. 11, 1939 |
| 2,714,823 | Dall et al. | Aug. 9, 1955 |